United States Patent
Bagepalli et al.

(10) Patent No.: US 9,074,581 B2
(45) Date of Patent: Jul. 7, 2015

(54) CONE ANGLE INSERT FOR WIND TURBINE ROTOR

(75) Inventors: Bharat Bagepalli, Niskayuna, NY (US); Mohan Muthu Kumar Sivanantham, Bangalore (IN); Bradley Graham Moore, Greenville, SC (US); Darren John Danielsen, Glenville, NY (US)

(73) Assignee: General Electric Company, Schanectedy, NY (US)

( * ) Notice: Subject to any disclaimer, the term of this patent is extended or adjusted under 35 U.S.C. 154(b) by 545 days.

(21) Appl. No.: 13/494,217

(22) Filed: Jun. 12, 2012

(65) Prior Publication Data
US 2013/0330199 A1    Dec. 12, 2013

(51) Int. Cl.
  *F04D 29/34*    (2006.01)
  *F03D 1/06*    (2006.01)

(52) U.S. Cl.
  CPC ............. *F03D 1/0658* (2013.01); *Y02E 10/721* (2013.01); *Y02E 10/726* (2013.01)

(58) Field of Classification Search
  CPC .............................. F03D 1/0658; F03D 1/065
  USPC .......................... 415/4.2, 129; 416/246, 204 R
  See application file for complete search history.

(56) References Cited

U.S. PATENT DOCUMENTS

| | | |
|---|---|---|
| 7,381,029 B2 | 6/2008 | Moroz |
| 7,780,417 B2 | 8/2010 | Kirchner et al. |
| 2006/0099076 A1 | 5/2006 | Wobben |
| 2008/0191488 A1 | 8/2008 | Kirchner et al. |
| 2009/0148291 A1 | 6/2009 | Gerber et al. |
| 2009/0304513 A1 | 12/2009 | Jacobsen et al. |
| 2009/0317253 A1* | 12/2009 | Takata et al. .............. 416/134 R |
| 2009/0317256 A1 | 12/2009 | Quell |
| 2010/0092288 A1 | 4/2010 | Sorensen |
| 2010/0098552 A1 | 4/2010 | Aarhus |
| 2010/0290912 A1 | 11/2010 | Sorensen |
| 2011/0142636 A1 | 6/2011 | Curtin |

FOREIGN PATENT DOCUMENTS

| | | |
|---|---|---|
| DE | 3922199 | 7/1990 |
| EP | 2108819 | 10/2009 |
| EP | 2362091 | 8/2011 |
| FR | 2863318 | 6/2005 |
| GB | 2076064 | 11/1981 |
| WO | WO 99/14490 | 3/1999 |
| WO | WO 01/42647 | 6/2001 |
| WO | WO 03/060319 | 7/2003 |
| WO | WO 2004/061298 | 7/2004 |
| WO | WO 2009/085041 | 7/2009 |
| WO | WO 2010/067082 | 6/2010 |
| WO | WO 2011/134810 | 11/2011 |

* cited by examiner

*Primary Examiner* — Dwayne J White
*Assistant Examiner* — Jason Fountain
(74) *Attorney, Agent, or Firm* — Dority & Manning, P.A.

(57) ABSTRACT

A rotor for a wind turbine is disclosed. The rotor includes a hub, a rotor blade, and a bearing assembly configured to rotate the rotor blade with respect to the hub. The rotor further includes an insert, the insert including a first end, a second end, and a body extending therebetween. The first end is coupled to the hub and the second end is coupled to the bearing assembly. The second end defines a second plane oriented at a cone angle with respect to a first plane defined by the first end.

17 Claims, 12 Drawing Sheets

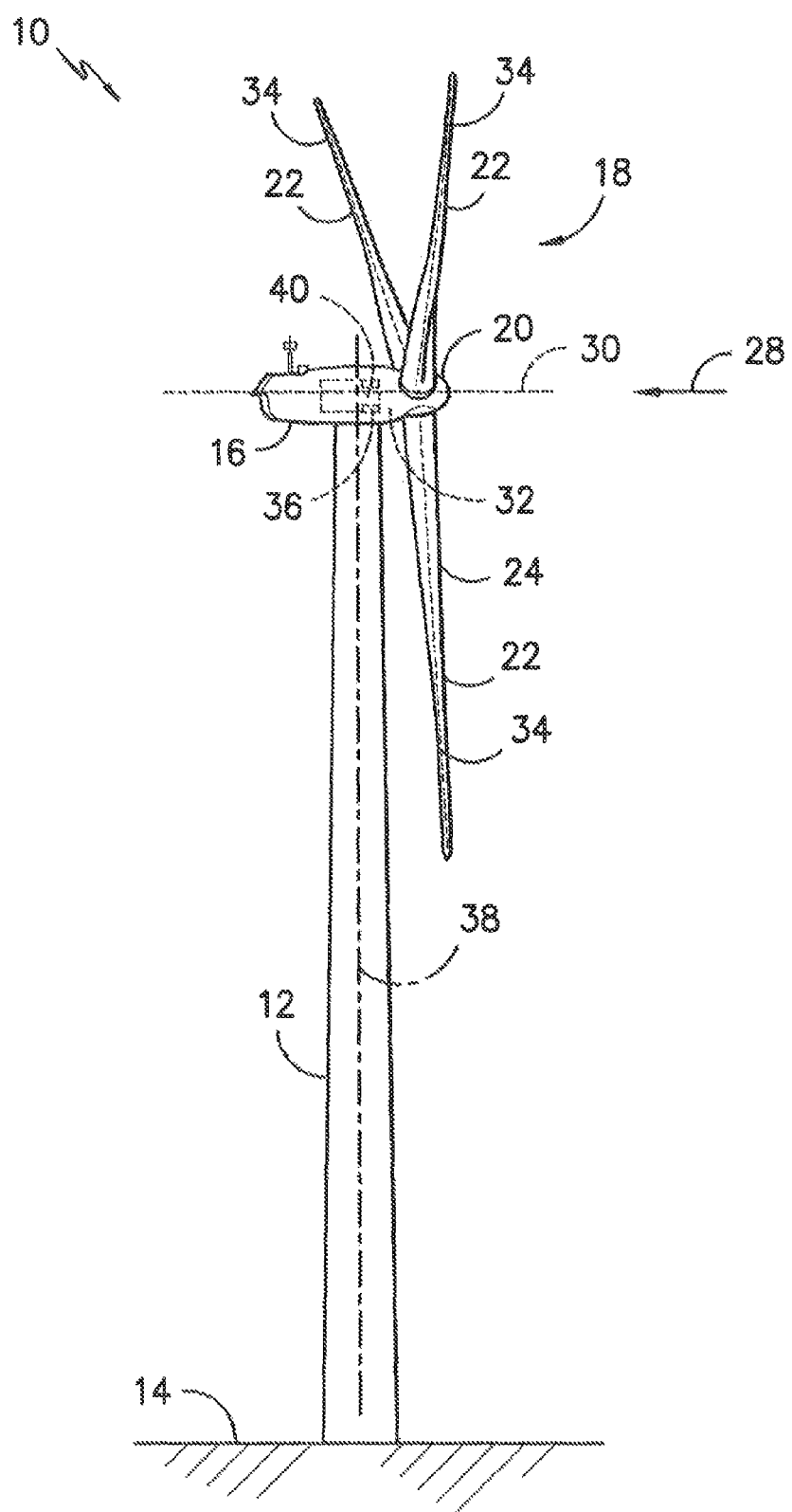
FIG. -1-

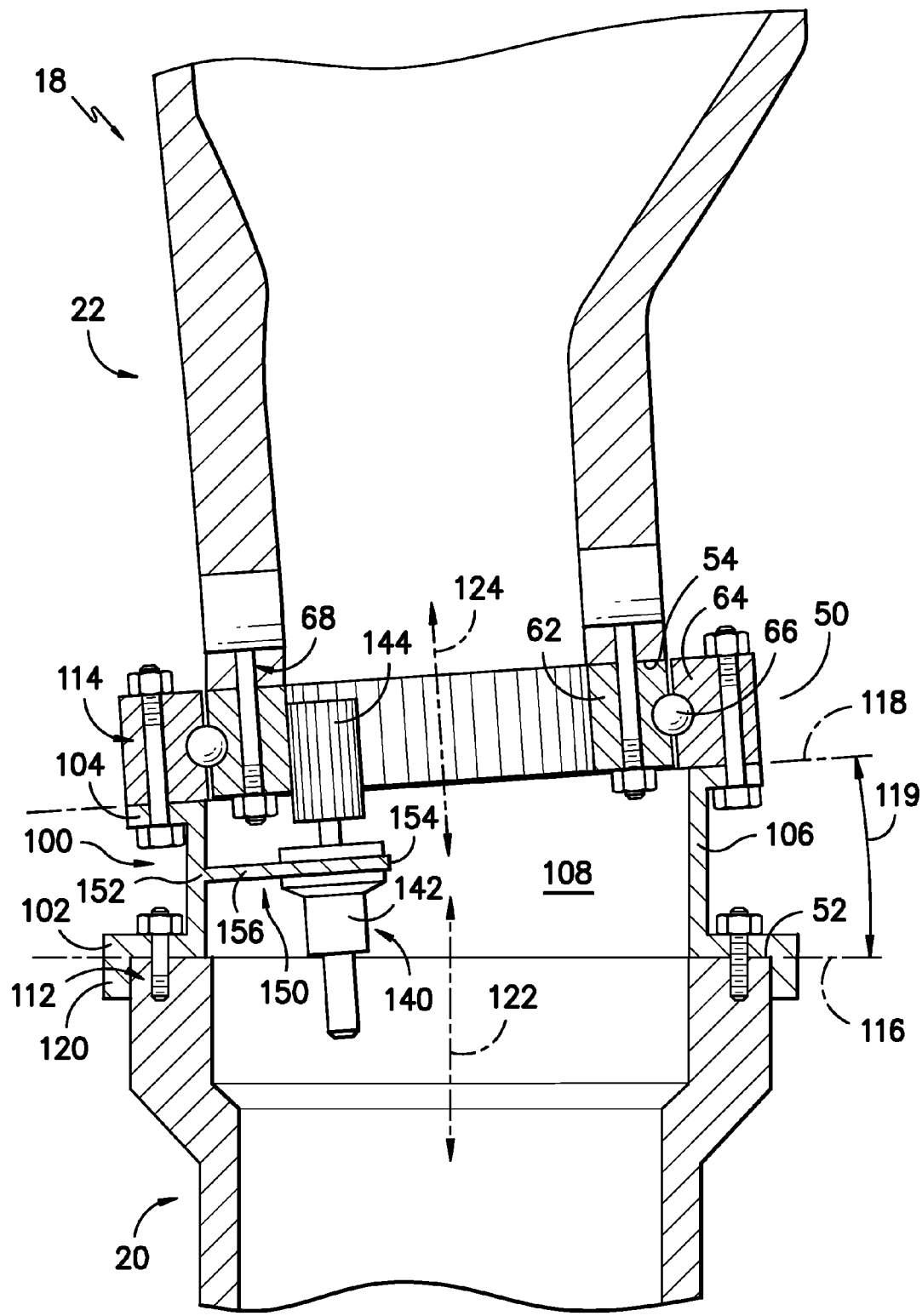
FIG. -2-

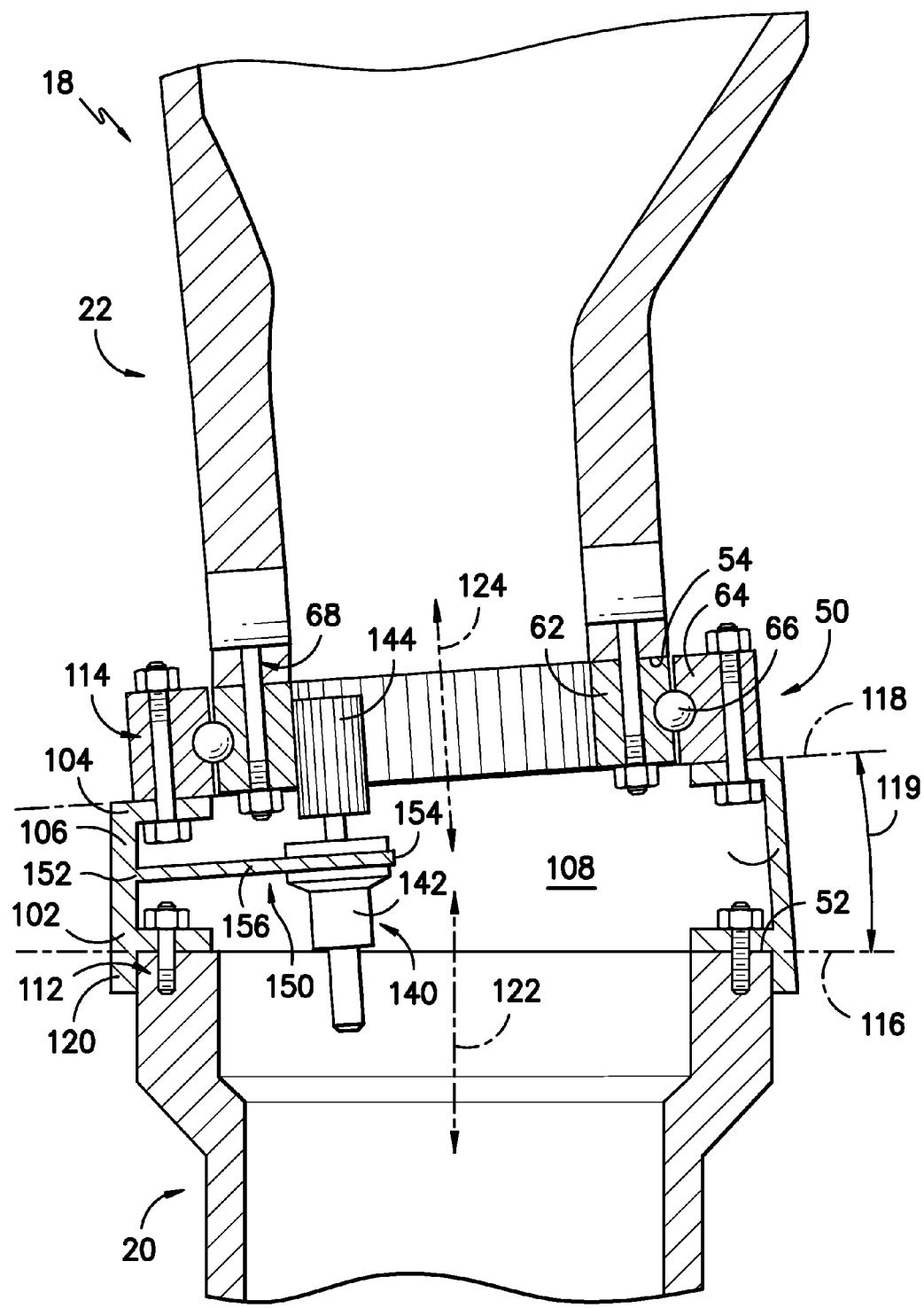
FIG. −3−

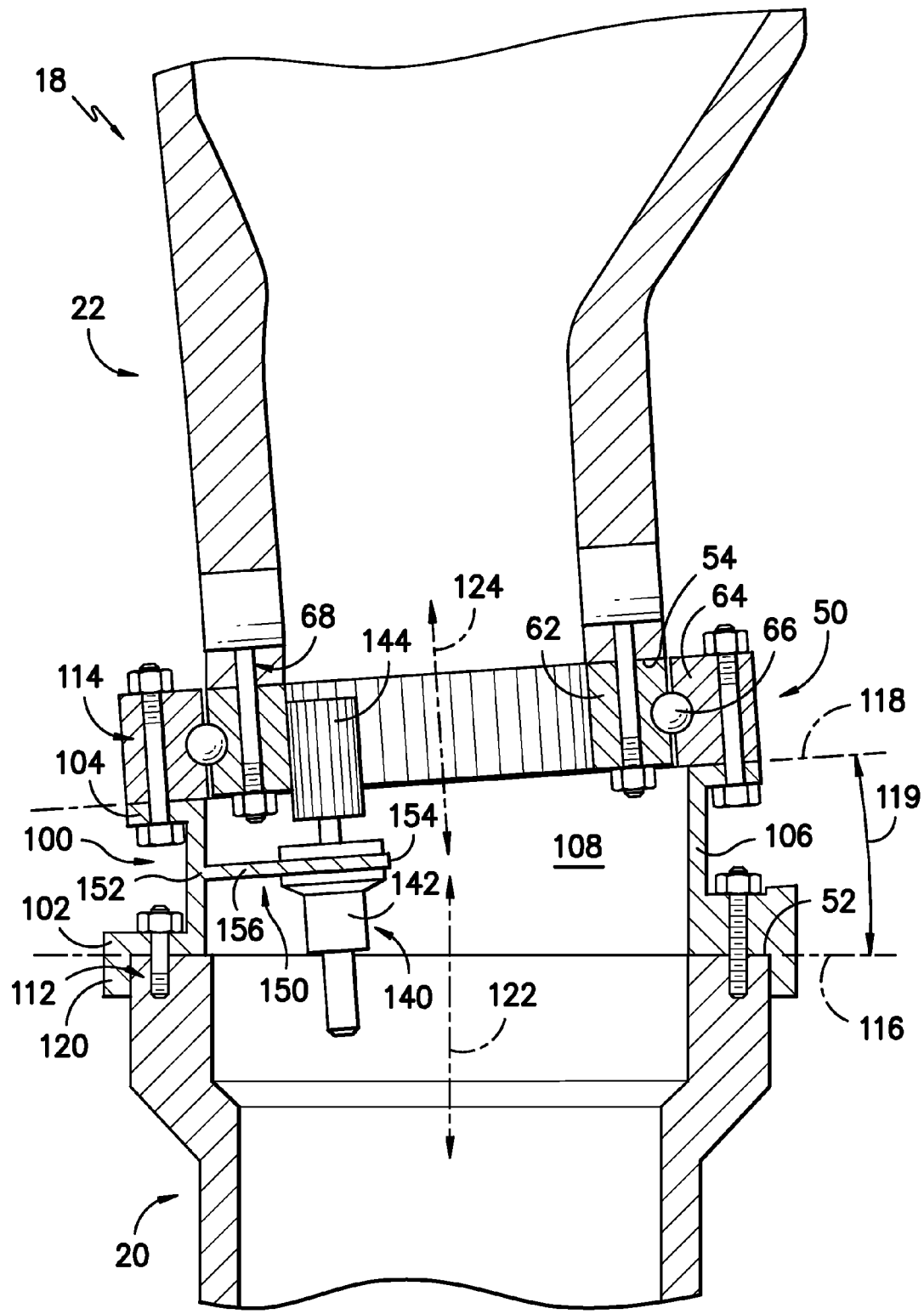
FIG. -4-

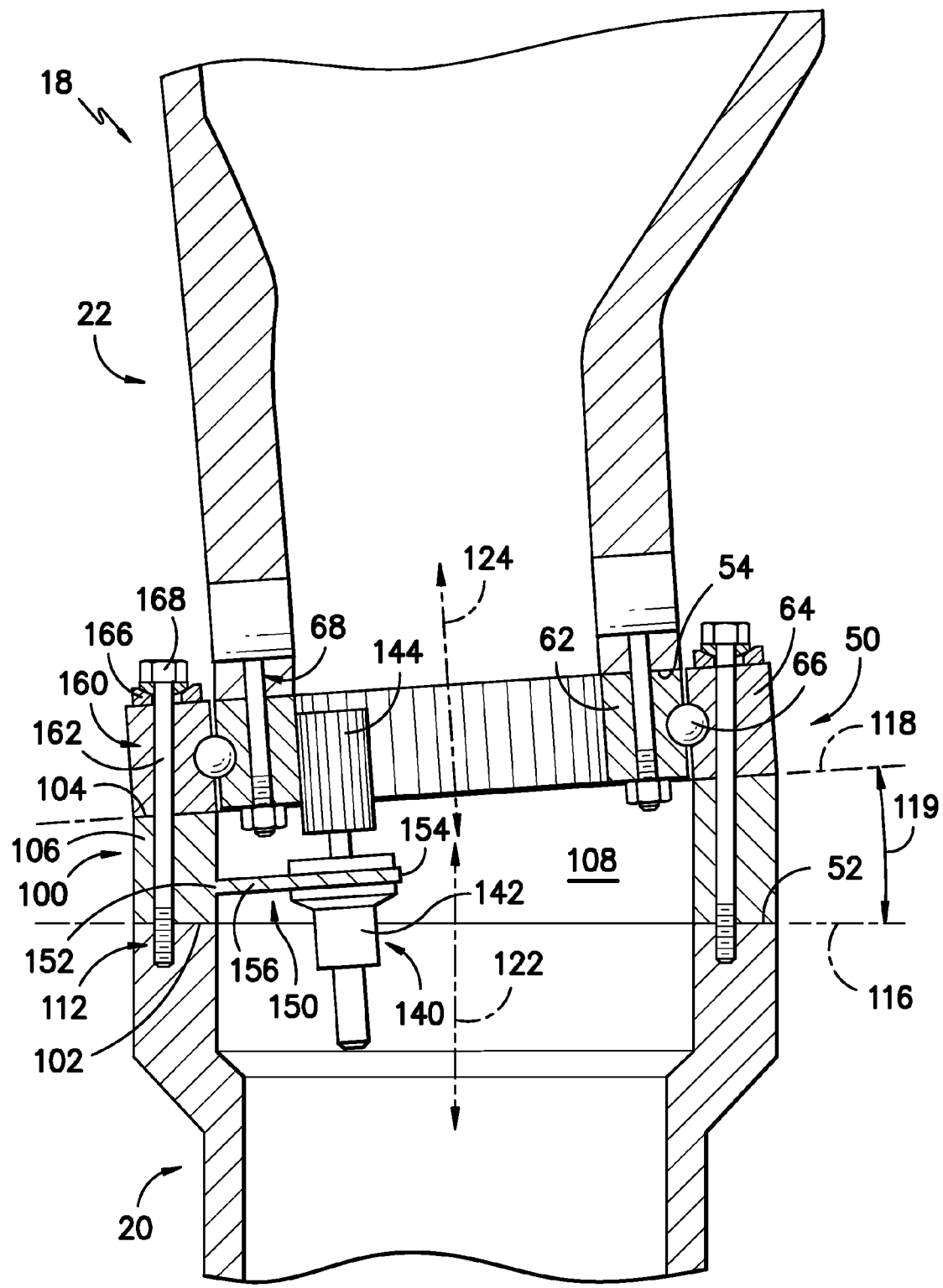
FIG. -5-

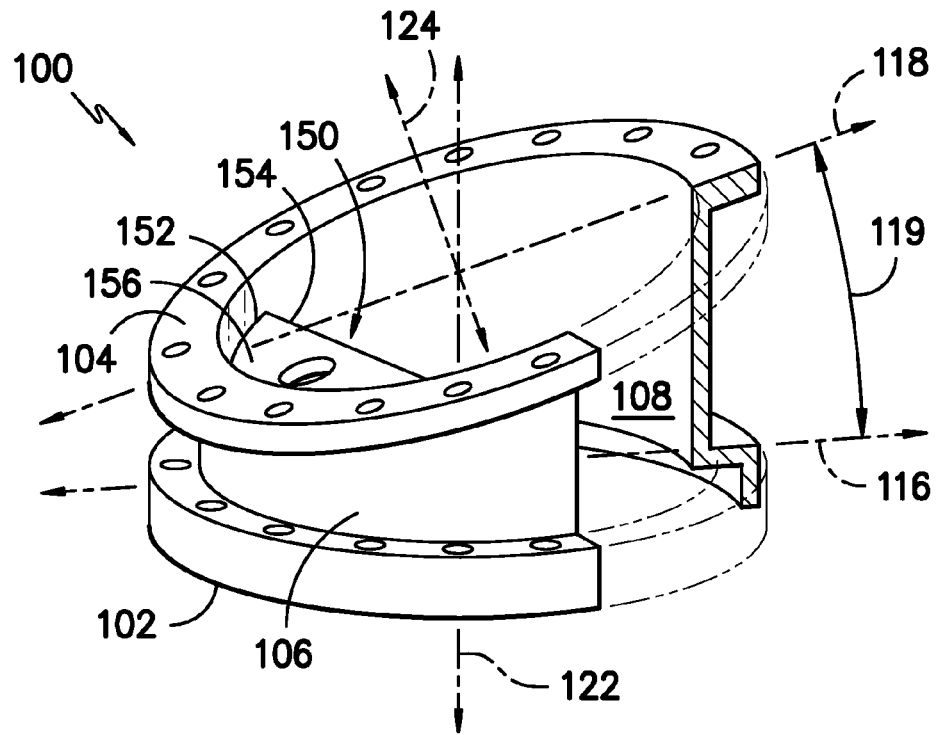
FIG. -6-
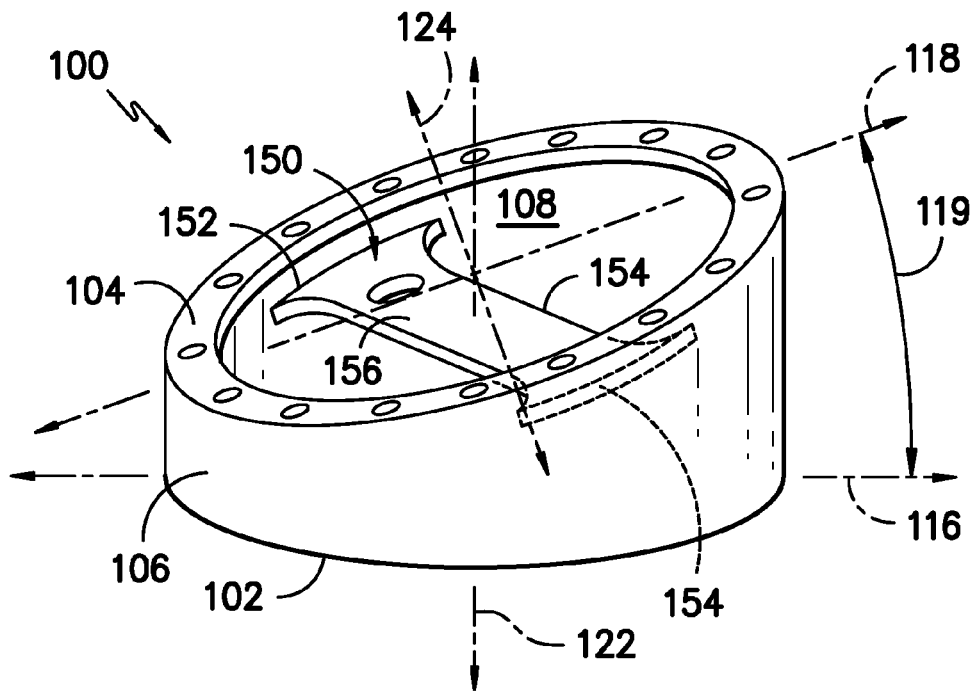
FIG. -7-

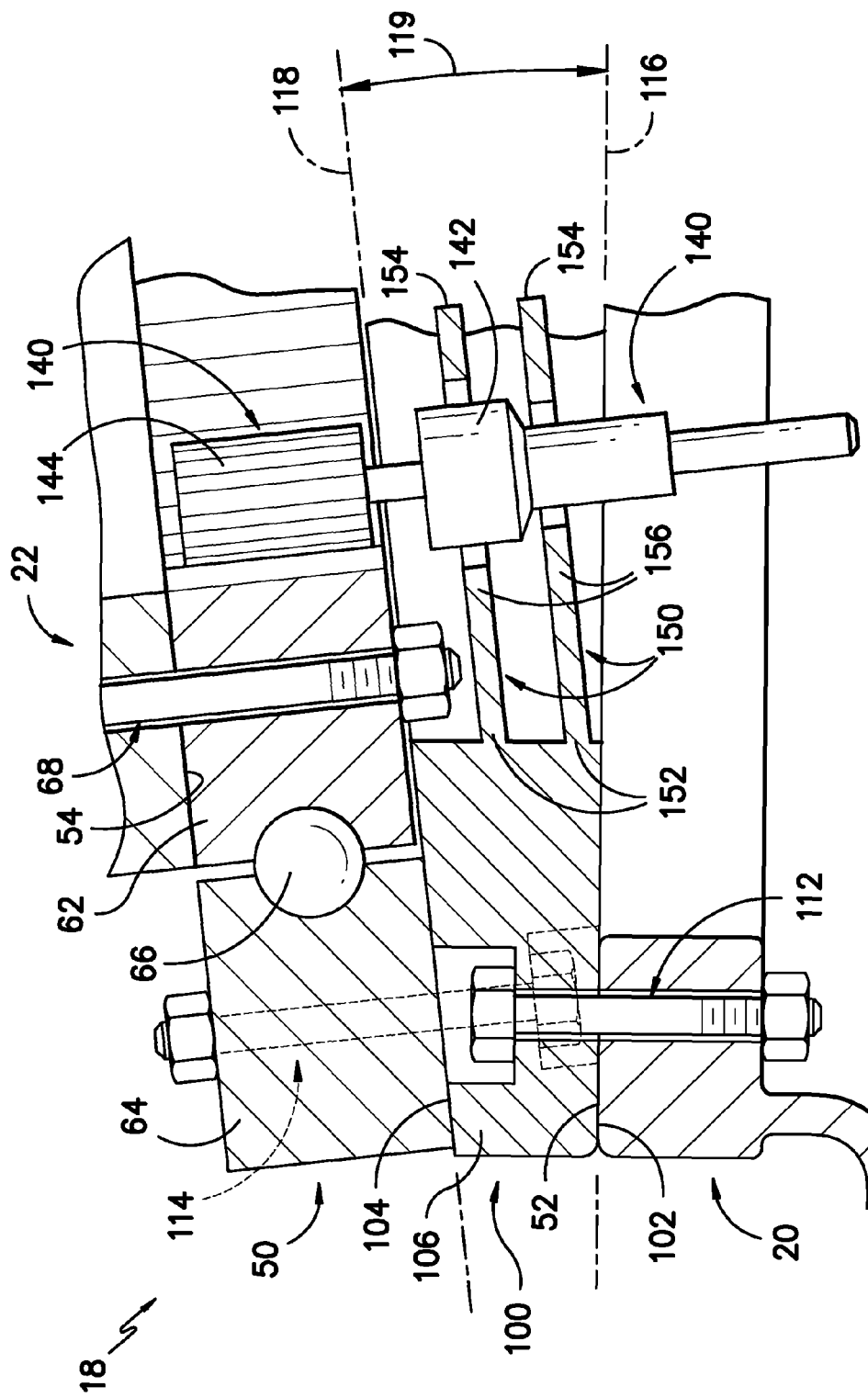
FIG. -8-

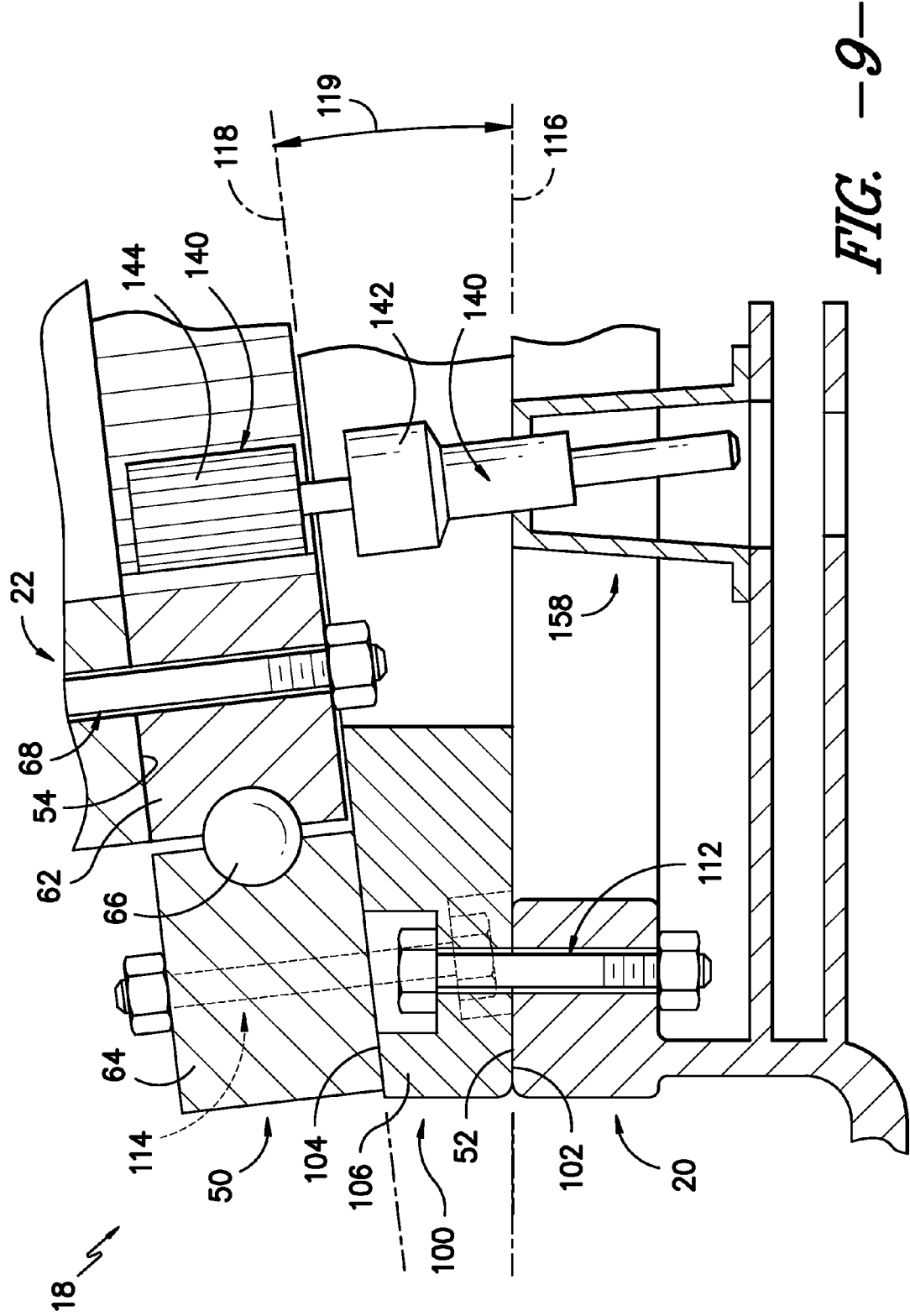
FIG. -9-

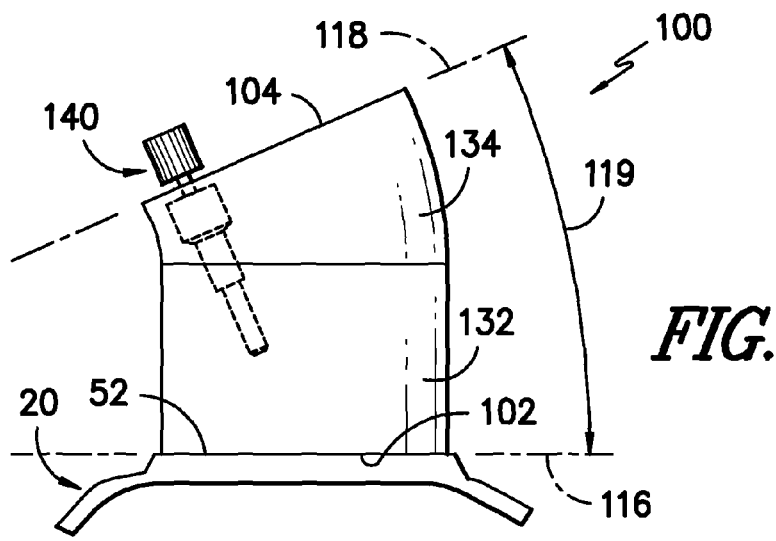
FIG. -10-
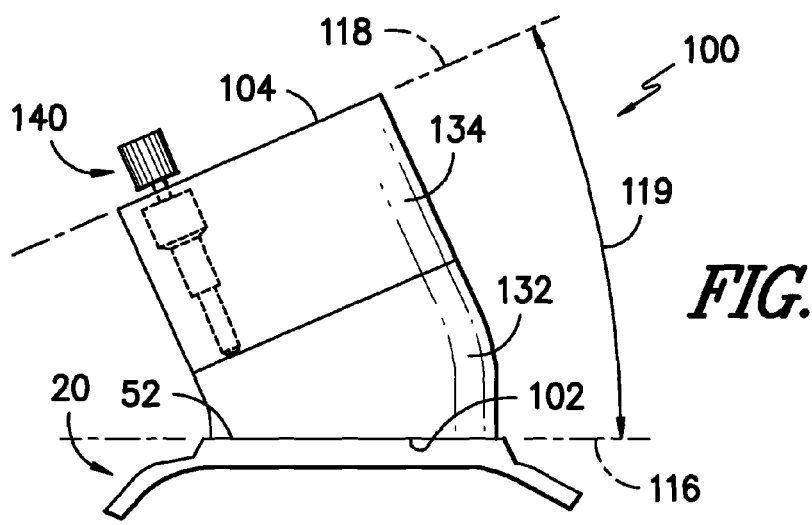
FIG. -11-
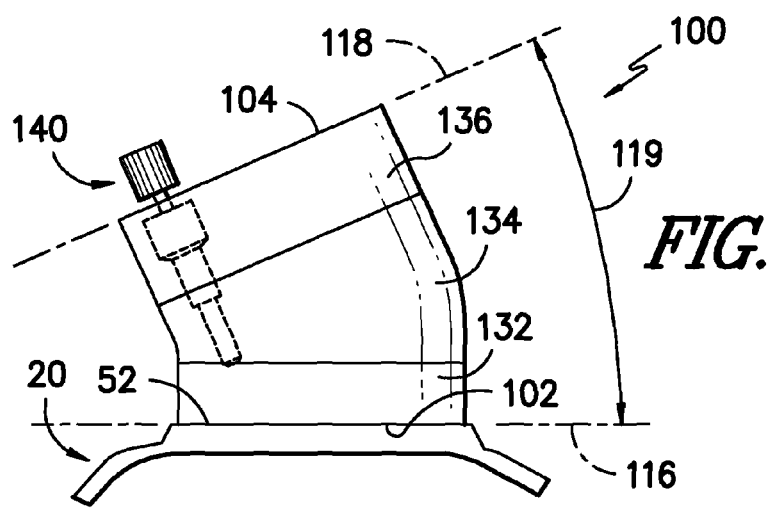
FIG. -12-

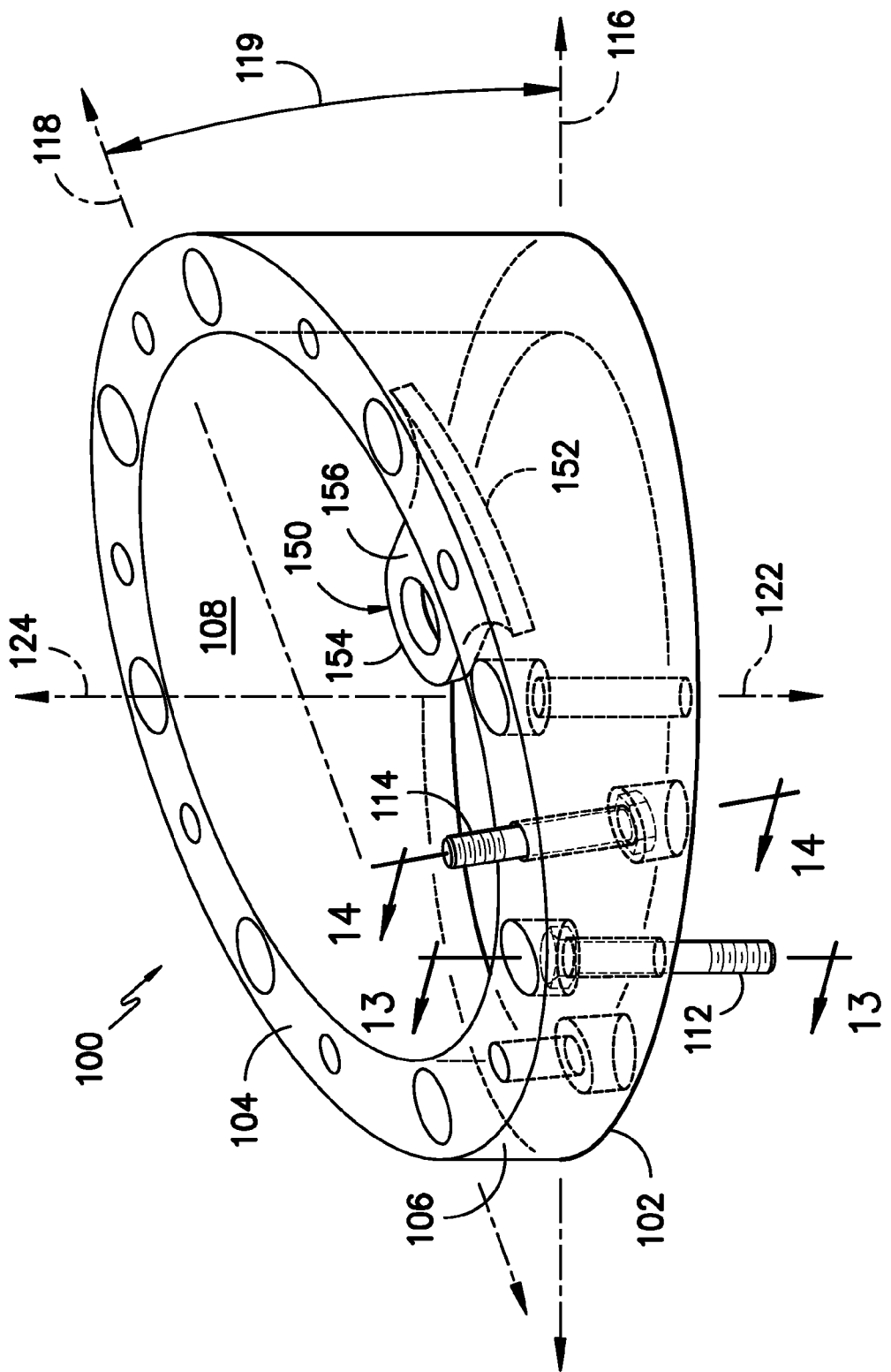
FIG. -13-

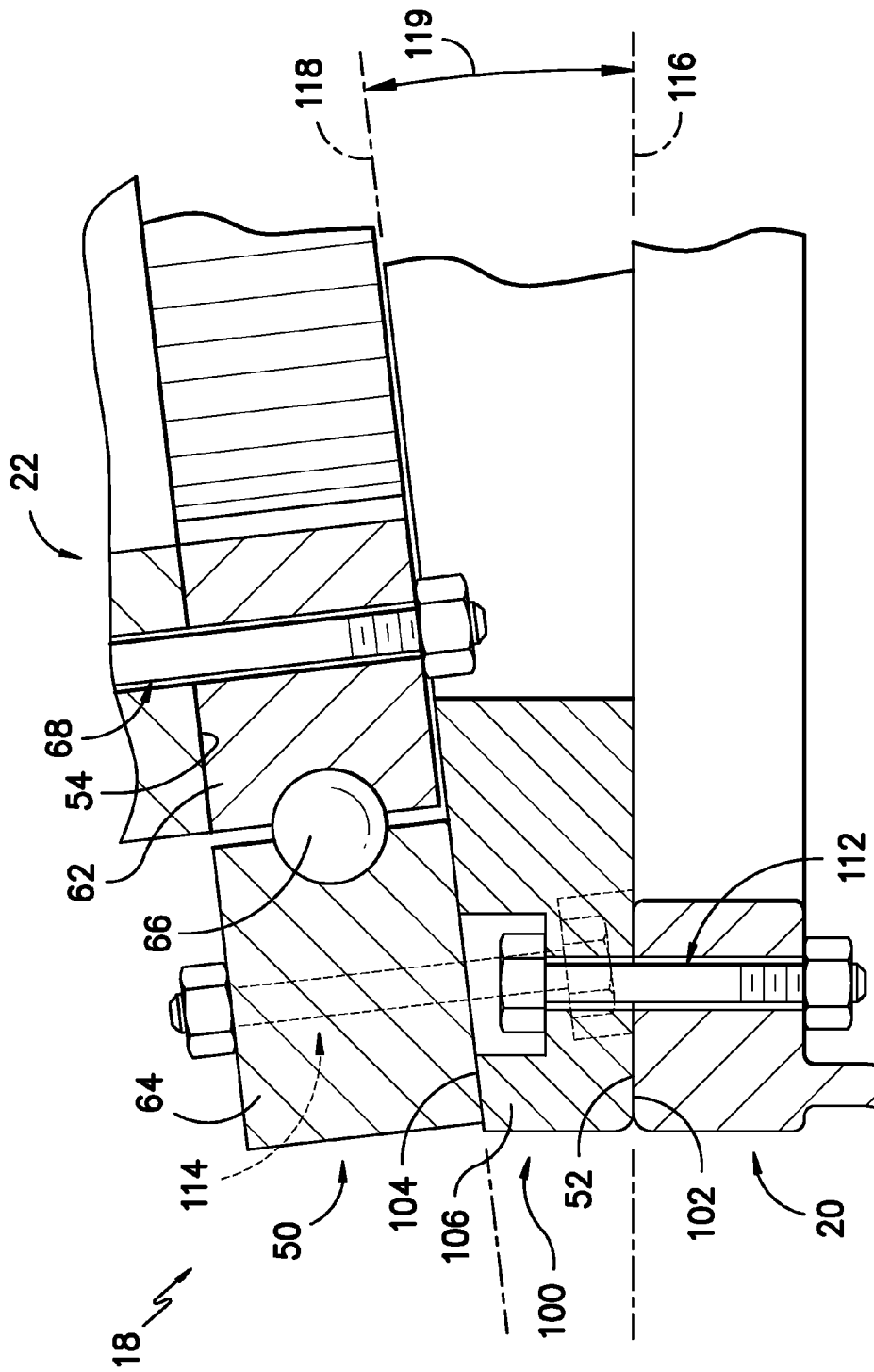
FIG. -14-

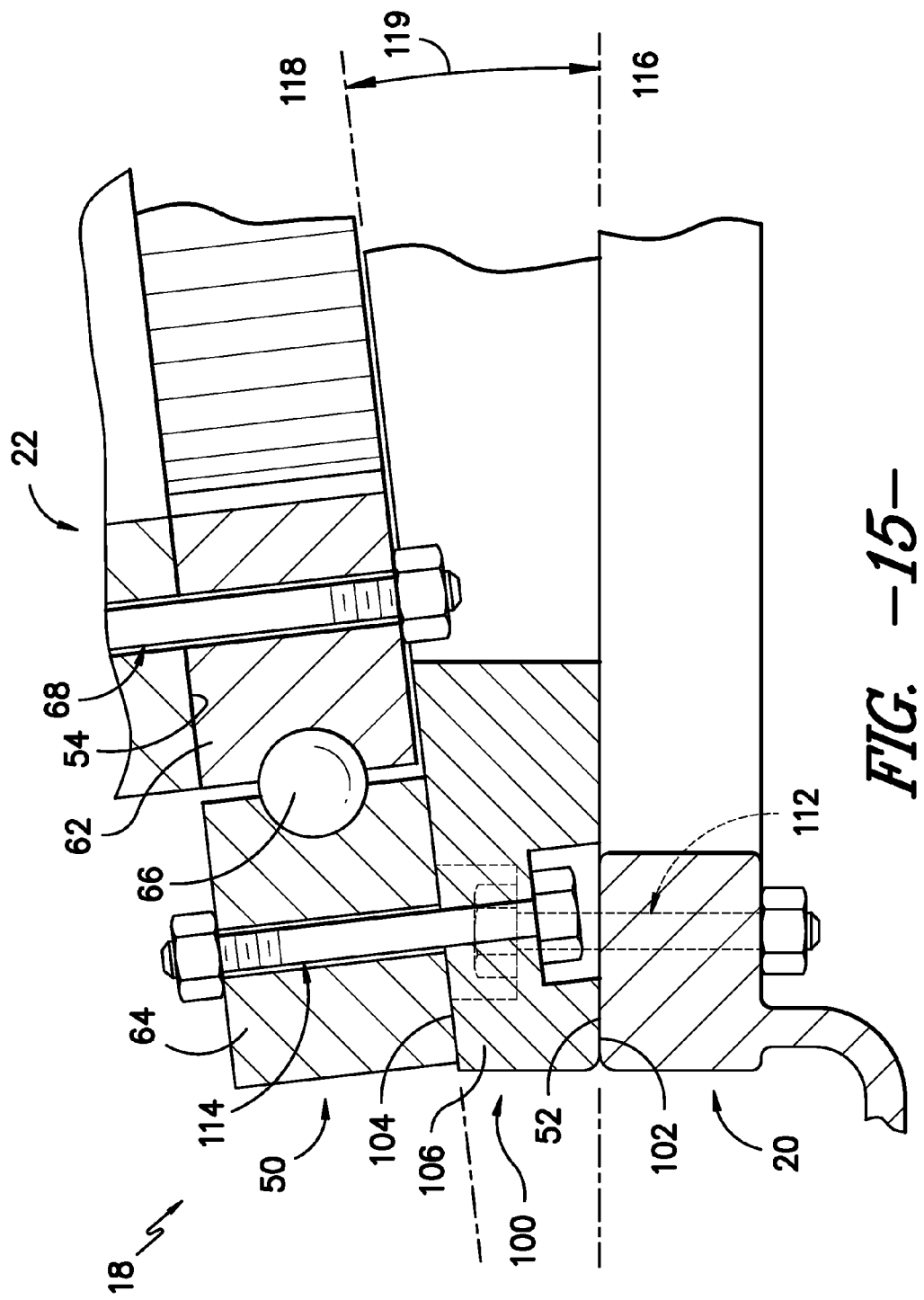
FIG. -15-

CONE ANGLE INSERT FOR WIND TURBINE ROTOR

FIELD OF THE INVENTION

The present disclosure relates in general to wind turbines, and more specifically to inserts for wind turbine rotors that angle rotor blades at cone angles.

BACKGROUND OF THE INVENTION

Generally, a wind turbine includes a tower, a nacelle mounted on the tower, and a rotor coupled to the nacelle. The rotor typically includes a rotatable hub and a plurality of rotor blades coupled to and extending outwardly from the hub. Each rotor blade may be spaced about the hub so as to facilitate rotating the rotor to enable kinetic energy to be transferred from the wind into usable mechanical energy, and subsequently, electrical energy.

In many cases it is generally desirable to increase the size of wind turbines, and specifically the rotor blades thereof. Increasing the size of the rotor blades increases the amount of energy that can be captured by the rotor blades. Such size increases, however, would also increase the amount by which the rotor blades can deflect during operation. Increases in deflection may lead to the rotor blades striking the tower during operation, which can damage or destroy the wind turbine.

Accordingly, various attempts have been made to reduce the risk of rotor blades striking wind turbine towers during wind turbine operation. For example, rotor blade curvature has been modified to curve the rotor blades away from the tower. However, such modifications can reduce the amount of energy that can be captured by the rotor blades. Further, rotor blades have been angled away from the tower at angles known as cone angles. For example, the hub flange connecting a rotor blade to the hub or the rotor blade root may be angled at a cone angle. Alternatively, spacers have been attached between a rotor blade and a hub, with a first flange of the spacer connected directly to the hub and a second flange connected directly to the rotor blade, that provide a cone angle. These coning attempts, however, have a variety of drawbacks. For example, angling of the hub flange or rotor blade root may stress these components and cause ovalization concerns. Use of spacers directly connected to the hub and rotor blade may similarly stress the components and cause ovalization concerns, and further cause rotor blade wobbling during operation. Further, these various coning attempts may not adequately address the need to pitch the rotor blades during operation, by for example not adequately facilitating the inclusion and proper performance of bearing assemblies and bearing drive assemblies.

Accordingly, an improved wind turbine rotor that provides coning is desired in the art. For example, an insert that provides coning while addressing various long-felt needs as described above would be advantageous.

BRIEF DESCRIPTION OF THE INVENTION

Aspects and advantages of the invention will be set forth in part in the following description, or may be obvious from the description, or may be learned through practice of the invention.

In one embodiment, a rotor for a wind turbine is disclosed. The rotor includes a hub, a rotor blade, and a bearing assembly configured to rotate the rotor blade with respect to the hub. The rotor further includes an insert, the insert including a first end, a second end, and a body extending therebetween. The first end is coupled to the hub and the second end is coupled to the bearing assembly. The second end defines a second plane oriented at a cone angle with respect to a first plane defined by the first end.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures, in which:

FIG. 1 illustrates a perspective view of one embodiment of a wind turbine according to the present disclosure;

FIG. 2 is a cross-sectional view of a portion of a rotor according to one embodiment of the present disclosure;

FIG. 3 is a cross-sectional view of a portion of a rotor according to another embodiment of the present disclosure;

FIG. 4 is a cross-sectional view of a portion of a rotor according to another embodiment of the present disclosure;

FIG. 5 is a cross-sectional view of a portion of a rotor according to another embodiment of the present disclosure;

FIG. 6 is a perspective view of an insert according to one embodiment of the present disclosure;

FIG. 7 is a perspective view of an insert according to another embodiment of the present disclosure;

FIG. 8 is a close-up cross-sectional view of a portion of a rotor according to one embodiment of the present disclosure;

FIG. 9 is a close-up cross-sectional view of a portion of a rotor according to another embodiment of the present disclosure;

FIG. 10 is a side view of an insert, a bearing drive assembly, and a portion of a hub according to one embodiment of the present disclosure;

FIG. 11 is a side view of an insert, a bearing drive assembly, and a portion of a hub according to another embodiment of the present disclosure;

FIG. 12 is a side view of an insert, a bearing drive assembly, and a portion of a hub according to another embodiment of the present disclosure;

FIG. 13 is a perspective view of an insert according to one embodiment of the present disclosure;

FIG. 14 is a close-up cross-sectional view of a portion of a rotor according to one embodiment of the present disclosure; and, FIG. 15 is a close-up cross-sectional view of a portion of a rotor according to another embodiment of the present disclosure.

DETAILED DESCRIPTION OF THE INVENTION

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used with another embodiment to yield a still further embodiment. Thus, it is intended that the present invention covers such modifications and variations as come within the scope of the appended claims and their equivalents.

FIG. 1 is a perspective view of an exemplary wind turbine 10. In the exemplary embodiment, wind turbine 10 is a horizontal-axis wind turbine. Alternatively, wind turbine 10 may be a vertical-axis wind turbine. In the exemplary embodiment, wind turbine 10 includes a tower 12 that extends from a support surface 14, a nacelle 16 mounted on tower 12, and a rotor 18 that is coupled to nacelle 16. Rotor 18 includes a rotatable hub 20 and at least one rotor blade 22 coupled to and extending outward from hub 20. In the exemplary embodiment, rotor 18 has three rotor blades 22. In an alternative embodiment, rotor 18 includes more or less than three rotor blades 22. In the exemplary embodiment, tower 12 is fabricated from tubular steel to define a cavity (not shown in FIG. 1) between support surface 14 and nacelle 16. In an alternative embodiment, tower 12 is any suitable type of tower having any suitable height.

Rotor blades 22 are spaced about hub 20 to facilitate rotating rotor 18 to enable kinetic energy to be transferred from the wind into usable mechanical energy, and subsequently, electrical energy. In one embodiment, rotor blades 22 have a length ranging from about 15 meters (m) to about 91 m. Alternatively, rotor blades 22 may have any suitable length that enables wind turbine 10 to function as described herein. For example, other non-limiting examples of blade lengths include 10 m or less, 20 m, 37 m, or a length that is greater than 91 m. As wind strikes rotor blades 22 from a direction 28, rotor 18 is rotated about an axis of rotation 30. As rotor blades 22 are rotated and subjected to centrifugal forces, rotor blades 22 are also subjected to various forces and moments. As such, rotor blades 22 may deflect and/or rotate from a neutral, or non-deflected, position to a deflected position. Moreover, a pitch angle or blade pitch of rotor blades 22, i.e., an angle that determines a perspective of rotor blades 22 with respect to direction 28 of the wind, may be changed to control the load and power generated by wind turbine 10 by adjusting an angular position of at least one rotor blade 22 relative to wind vectors. Pitch axes 34 for rotor blades 22 are shown. Such pitching (of blades individually and in combination) and otherwise adjusting of the rotor blades 22 and wind turbine 10 can decrease loading in both the blades 22 as well as in other components of the wind turbine 10. For example, torque and bending loads in a main shaft connecting the rotor 18 and a generator (discussed below) may be reduced, and bending of the tower 12 may be reduced. This can increase the life of these components and/or reduce the costs associated with wind turbine 10 design and operation.

In the exemplary embodiment, a blade pitch of each rotor blade 22 is controlled individually by a control system 36. Alternatively, the blade pitch for all rotor blades 22 may be controlled simultaneously by control system 36. Further, in the exemplary embodiment, as direction 28 changes, a yaw direction of nacelle 16 may be controlled about a yaw axis 38 to position rotor blades 22 with respect to direction 28.

In FIG. 1, control system 36 is shown as being centralized within nacelle 16, however, control system 36 may be a distributed system throughout wind turbine 10, on support surface 14, central to a plurality of wind turbines 10 in a wind farm, and/or at a remote control center. Control system 36 includes a processor 40 configured to perform the methods and/or steps described herein. Further, many of the other components described herein include a processor. As used herein, the term "processor" is not limited to integrated circuits referred to in the art as a computer, but broadly refers to a controller, a microcontroller, a microcomputer, a programmable logic controller (PLC), an application specific integrated circuit, and other programmable circuits, and these terms are used interchangeably herein. It should be understood that a processor and/or a control system can also include memory, input channels, and/or output channels.

FIGS. 2 through 15 illustrate various embodiments of various rotor 18 components according to the present disclosure. As discussed, a rotor 18 according to the present disclosure includes a hub 20 and one or more rotor blades 22. As shown, a rotor 18 further includes one or more bearing assemblies 50. Each bearing assembly 50 may be configured to rotate a rotor blade 22 with respect to a hub 20, such as about a pitch axis 34 as discussed above. Thus, a bearing assembly 50 may be disposed between a hub flange 52 of a hub 20 and a root 54 of a rotor blade 22. As shown, a bearing assembly 50 according to some embodiments may include an inner race 62, an outer race 64, and a plurality of bearing elements 66, such as balls, therebetween. The inner race 62 may be coupled to the rotor blade 22, such as to the root 54 thereof, by a plurality of mechanical fasteners 68. Any suitable mechanical fastener, such as a bolt-barrel nut combination, bolt-nut combination, screw, nail, rivet, or other suitable mechanical fastening device, may be utilized in accordance with the present disclosure. The inner race 62 may rotate with respect to outer race 64 to rotate the rotor blade 22. Alternatively, any suitable bearing assembly 50 may be utilized in accordance with the present disclosure to rotate a rotor blade 22 with respect to a hub 20.

As shown, a rotor 18 according to the present disclosure further includes an insert 100. An insert 100 according to the present disclosure is, in exemplary embodiments, a generally annular or cylindrical component of the rotor 18. The insert 100 is coupled to the and between the hub 20 and the bearing assembly 50. An insert 100 according to the present disclosure orients an associated rotor blade 22 at a cone angle, and further may provide additional advantageous characteristics to the rotor 18. For example, the insert 100 may include stiffening components and/or may be configured to reduce or prevent the risk of ovalization during operation. Further, the insert 100 may address and reduce the risk of wobbling, as well as stress concerns.

An insert 100 according to the present disclosure may include, for example, a first end 102, a second end 104, and a body 106 extending therebetween. The body 106 may be generally hollow, and thus define an interior 108 therein. As discussed, the body 106 in exemplary embodiments is generally cylindrical. The first end 102 may be coupled to the hub 20. Thus, for example, the first end 102 may be a first flange that mates to the hub 20. One or more mechanical fasteners 112 may extend through the first end 102 and the hub 20 to couple the first end 102 and hub 20 together. The second end 104 may be coupled to the bearing assembly 50. Thus, for example, the second end 104 may be a second flange that mates to the bearing assembly 50, such as to the outer race 64 thereof. One or more mechanical fasteners 114 may extend through the second end 104 and the bearing assembly 50 to couple the second end 104 and bearing assembly 50 together. The mechanical fasteners 112, 114 in exemplary embodiments are nut-bolt combinations, but in other embodiments may be any suitable mechanical fastener as discussed herein. In other embodiments, the first end 102 and second end 104 may be respectively coupled to the hub 20 and bearing assembly 50 by, for example, welding or any other suitable coupling process or apparatus.

In other exemplary embodiments, as shown in FIG. 5, a plurality of mechanical fasteners 160 may extend through and couple together the hub 20, insert 100, and bearing assembly 50. Each mechanical fastener 160 may thus extend through each of the hub 20, insert 100, and bearing assembly 50 as shown. Further, in some embodiments, the mechanical fasteners 160 may extend through the hub 20 at a cone angle. In exemplary embodiments, for example, a mechanical fastener 160 may include a nut-bolt combination. Specifically, the mechanical fastener 160 according to some embodiments includes a bolt 162. The bolt 162 extends through the bearing assembly 50, such as the outer race 64 thereof, through the insert 100, and through the hub 20. In some embodiments, the mechanical fastener 160 further includes a washer, which in exemplary embodiments is a self-aligning washer 166. The washer 166 may, for example, be disposed between a head 168 of the bolt 162 and the bearing assembly 50, such as the outer race 64 thereof, or other suitable rotor component. Because the washer 166 is self-aligning, the bolt 162 may be allowed to extend through the bearing assembly 50, insert 100, and hub 20 at an angle to various of the components, in order to accommodate a cone angle, as discussed below, provided to the rotor blade 22 by the insert 100. The self-aligning washer 166 may allow the bolt 162, and specifically the head 168 thereof, to seat properly with the bearing assembly 50 while extending at an angle to the bearing assembly 50, as shown.

The first end 102 defines a first plane 116, and the second end 104 similarly defines a second plane 118. As shown, the second plane 118 is oriented at a cone angle 119 with respect to the first plane 116. A cone angle 119 is in some embodiments between approximately 0.1 degrees and approximately 5 degrees, in other embodiments between approximately 0.5 degrees and approximately 5 degrees, in other embodiments between approximately 1 degree and approximately 5 degrees, in other embodiments between approximately 1 degree and approximately 4 degrees. Thus, an insert 100 according to the present disclosure advantageously orients an associated rotor blade 22 at a cone angle 119.

As discussed, mechanical fasteners 114, 116 may couple the first end 102 and second end 104 to the respective hub 20 and bearing assembly 50. In some embodiments, as shown in FIGS. 2 and 4, the mechanical fasteners 114 and/or 116 may be accessible externally of the insert 100. In these embodiments, the mechanical fasteners 114 and/or 116 are not contained in the interior 108 or the body 106 itself, but rather extend through the first end 102 and/or second end 104 from outside of the insert 100. Such configuration allows for rotor maintenance from outside of the insert 100 without need to access the interior 108. In other embodiments, as shown in FIG. 3, the mechanical fasteners 114 and/or 116 may be accessible from the interior 108 of the insert 100. In these embodiments, the mechanical fasteners 114 and/or 116 extend through the first end 102 and/or second end 106 from the interior 108, and the body 106 generally surrounds those portions of the mechanical fasteners 114 and/or 116 in the interior. Such configuration allows for rotor maintenance from inside of the insert 100 without need to access the exterior of the insert. In still other embodiments, as shown in FIGS. 5 and 13 through 15, the mechanical fasteners 114 and/or 116 may be accessible only from the first end 102 and/or second end 106, and may thus extend through the body 106.

An insert 100 according to the present disclosure may in some embodiments include a lip 120. The lip 120 extends from the first end 102 towards the hub 20 such that the lip 120 at least partially surrounds the hub 20. A lip 120 according to the present disclosure is in exemplary embodiments generally cylindrical, such that the lip 120 can surround and contact a portion of the hub 20. In other embodiments, the lip 120 has a shape that generally corresponds to the shape of the hub 20. Further, the lip 120 in exemplary embodiments is generally peripherally continuous. Alternatively, however, the lip need not be entirely continuously, and may rather have one or more lip portions that are separated from each other and that each extend towards and surround the hub 20. By surrounding a portion of the hub 20, the lip 120 stiffens and thus reinforces the first end 102 and insert 100 in general, thus preventing ovalization of the insert 100 during operation.

As discussed, the body 106 of the insert 100 extends between the first end 102 and the second end 104. The body 106 may, for example, extend along an central axis. In some embodiments, the axis 122 is perpendicular to the first plane 116, as shown for example in FIG. 2. In other embodiments, the axis 124 is perpendicular to the second plane 118, as shown for example in FIGS. 3 and 4. In other embodiments, as shown in FIGS. 10 through 12 and discussed below, portions of the body 106 may extend along axis 122 while other portions extend along axis 124.

The body 106 of an insert 100 according to the present disclosure is in some embodiments formed as a single unitary component, as shown for example in FIGS. 2 through 9 and 13 through 15. In other embodiments, the body 106 may be formed from multiple separate components that are coupled together by, for example, mechanical fasteners, welding, or any other suitable coupling process or apparatus. FIGS. 10 through 12 illustrate various embodiments of multiple component bodies 106.

As shown in FIG. 10, for example, a body 106 may include a first portion 132 and a second portion 134. The first portion 132 may extend along axis 122 perpendicular to the first plane 116. The second portion 134 may be an elbow portion. An elbow portion is at least partially curved to at least partially provide a transition for the body 106 from extending along axis 122 to extending along axis 124. In the embodiment as shown, the first portion 132 includes the first end 102, and the second portion 134 includes the second end 104.

As shown in FIG. 11, for example, a body 106 may include a first portion 132 and a second portion 134. The first portion 132 may be an elbow portion. The second portion 134 may extend along axis 124 perpendicular to the second plane 118. In the embodiment as shown, the first portion 132 includes the first end 102, and the second portion 134 includes the second end 104.

As shown in FIG. 12, for example, a body 106 may include a first portion 132, a second portion 134, and a third portion 136. The first portion 132 may extend along axis 122 perpendicular to the first plane 116. The second portion 134 may be an elbow portion. The third portion 136 may extend along an axis 124 perpendicular to the second plane 118. In the embodiment as shown, the first portion 132 includes the first end 102, and the third portion 136 includes the second end 104.

Bodies formed from multiple components as discussed above may provide various advantages. For example, the use of multiple portions allows the rotor blade 22 to be shifted further from the tower 12 which, along with the coning angle, may further reduce the risk of contact with the tower 12. Further, the use of an elbow portion may allow for the interface between the components to be circular, rather than oval. This may provide advantageous stress characteristics, and may serve to reduce ovalization during operation.

A rotor 18 according to the present disclosure further includes one or more bearing drive assemblies 140. Each bearing drive assembly 140 according is associated with a rotor blade 22, and drives the bearing assembly 50 associated with that rotor blade 22 to rotate the rotor blade 22, such as about a pitch axis 34 as discussed above. A bearing drive assembly 140 may include, for example, a motor 142 and a gear 144. The motor 142 may rotationally drive the gear 144. Teeth of the gear 144 may mesh with the bearing assembly 50, such as with an inner race 62 thereof, and may rotate, thus rotating the bearing assembly 50 and the rotor blade 22 coupled thereto.

The bearing drive assembly 140 may be supported in the rotor 18. In some embodiments, an insert 100 includes components configured to support a bearing drive assembly 140. For example, a bearing drive assembly 140 may be at least partially disposed within an interior 108 of an insert 100. The insert 100 may include one or more webs 150. As shown in FIGS. 2 through 5 and 8, the bearing drive assembly 140 in some embodiments may extend through and be coupled to a web 150, such as by mechanical fasteners, welding, or any other suitable coupling process or apparatus. Additionally or alternatively, the bearing drive assembly 140 may extend through and contact, but not be coupled to, a web 150. Such a web 150 may stabilize the position of the bearing drive assembly 150 in the insert 100. For example, FIG. 8 illustrates two webs 150. One web 150 is coupled to the bearing drive assembly 140, while the other stabilizes the bearing drive assembly 140. In other embodiments, the bearing drive assembly 140 need not be supported by a component of the insert 100. For example, a bearing drive assembly 140 may be coupled to and supported by a component of the hub 20, such as by a bracket 158 disposed in the hub 20 as shown in FIG. 9.

A web 150 according to the present disclosure may include a first end 152, a second end 154, and a body 156 extending therebetween. In some embodiments, as shown for example in FIGS. 2 through 6 and 8, the web may be cantilevered. Thus, only one of the first end 152 and the second end 154 is coupled to the body 106 of the insert 100, while the other is free in the interior 108 of the insert 100. In other embodiments, as shown in FIG. 7, both the first end 152 and the second end 154 are coupled to the body 106. The web 150 in these embodiments thus extends across the entire interior 108 of the insert 100. Further, in these embodiments, the web 150 further stiffens the insert 100, providing improved stress characteristics and reducing ovalization during operation.

As discussed, an insert 100 according to the present disclosure may in some embodiments include a first plurality of mechanical fasteners 112 for coupling the insert 100 to the hub 20, and a second plurality of mechanical fasteners 114 for coupling the insert 100 to the bearing assembly 50. In some embodiments, as shown in FIGS. 8, 9, and 13 through 15, the mechanical fasteners 112, 114 may be staggered about periphery of the insert 100, and thus about the first end 102 and/or second end 104. As shown, the mechanical fasteners in these embodiments thus alternate about the periphery of the insert 100. This allows for ease of assembling the rotor 18, such as ease of coupling the insert 100 to the hub 20 and bearing assembly 50. This is especially advantageous in embodiments wherein the mechanical fasteners are only accessible from the ends 102, 104.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. A rotor for a wind turbine, comprising:
   a hub;
   a rotor blade;
   a bearing assembly configured to rotate the rotor blade with respect to the hub; and,
   an insert, the insert comprising a first end, a second end, and a body extending therebetween, the first end coupled to the hub and the second end coupled to the bearing assembly, the second end defining a second plane oriented at a cone angle with respect to a first plane defined by the first end;
   a bearing drive assembly disposed at least partially within an interior of the insert; and
   a web extending into the interior and comprising a first end, a second end, and a body extending therebetween, the bearing drive assembly coupled to the web, and wherein the web is cantilevered such that only one of the first end and the second end is coupled to the body.

2. The rotor of claim 1, further comprising a plurality of mechanical fasteners coupling the second end of the insert to the bearing assembly, each of the plurality of mechanical fasteners accessible externally of the insert.

3. The rotor of claim 1, further comprising a plurality of mechanical fasteners coupling the second end of the insert to the bearing assembly, each of the plurality of mechanical fasteners accessible from an interior of the insert.

4. The rotor of claim 1, wherein the insert further comprises a lip extending from the first end towards the hub such that the lip at least partially surrounds the hub.

5. The rotor of claim 1, wherein the body of the insert extends along an axis extending perpendicular to the first plane.

6. The rotor of claim 1, wherein the body of the insert extends along an axis extending perpendicular to the second plane.

7. The rotor of claim 1, wherein the body comprises a first portion extending along an axis extending perpendicular to the first plane and a second portion, wherein the second portion is an elbow portion.

8. The rotor of claim 1, wherein the body comprises a first portion, wherein the first portion is an elbow portion, and a second portion extending along an axis extending perpendicular to the second plane.

9. The rotor of claim 1, wherein the body comprises a first portion extending along an axis extending perpendicular to the first plane, a second portion wherein the second portion is an elbow portion, and a third portion extending along an axis extending perpendicular to the second plane.

10. The rotor of claim 1, further comprising a plurality of first mechanical fasteners for coupling the insert to the hub and a plurality of second mechanical fasteners for coupling the insert to the bearing assembly, and wherein the plurality of first mechanical fasteners and the plurality of second mechanical fasteners are generally annularly staggered about the first end and the second end.

11. A wind turbine, comprising:
    a tower;
    a nacelle mounted to the tower;
    a rotor coupled to the nacelle, the rotor comprising:
       a hub;
       a rotor blade;
       a bearing assembly configured to rotate the rotor blade with respect to the hub; and, an insert, the insert comprising a first end, a second end, and a body extending therebetween, the first end coupled to the hub and the second end coupled to the bearing assembly, the second end defining a second plane oriented at a cone angle with respect to a first plane defined by the first end;

a bearing drive assembly disposed at least partially within an interior of the insert; and a web extending into the interior and comprising a first end, a second end, and a body extending therebetween, the bearing drive assembly coupled to the web, and wherein the web is cantilevered such that only one of the first end and the second end is coupled to the body.

12. The wind turbine of claim 11, wherein the insert further comprises a lip extending from the first end towards the hub such that the lip at least partially surrounds the hub.

13. The wind turbine of claim 11, further comprising a bearing drive assembly and a web, the bearing drive assembly disposed at least partially within an interior of the insert, the web extending into the interior and comprising a first end, a second end, and a body extending therebetween, the bearing drive assembly coupled to the web.

14. The wind turbine of claim 11, wherein the body comprises a first portion extending along an axis extending perpendicular to the first plane and a second portion, wherein the second portion is an elbow portion.

15. The wind turbine of claim 11, wherein the body comprises a first portion wherein the first portion is an elbow portion, and a second portion extending along an axis extending perpendicular to the second plane.

16. The wind turbine of claim 11, wherein the body comprises a first portion extending along an axis extending perpendicular to the first plane, a second elbow portion, wherein the second portion is an elbow portion, and a third portion extending along an axis extending perpendicular to the second plane.

17. The wind turbine of claim 11, further comprising a plurality of first mechanical fasteners for coupling the insert to the hub and a plurality of second mechanical fasteners for coupling the insert to the bearing assembly, and wherein the plurality of first mechanical fasteners and the plurality of second mechanical fasteners are generally annularly staggered about the first end and the second end.

* * * * *